July 7, 1970 W. KIENZLE 3,519,847

CIRCUIT ARRANGEMENT FOR DEMODULATING FREQUENCY SHIFT KEYED BINARY SIGNALS

Filed April 21, 1966 3 Sheets-Sheet 1

INVENTOR
WERNER KIENZLE

BY

ATTORNEY

——— a1, b1 normal
– – – a2, b2 quality of both circuits respectivly amplitudes changed
– · – a3, b3 quality of one circuit respectivly amplitude changed

INVENTOR
WERNER KIENZLE

BY [signature]
ATTORNEY

INVENTOR
WERNER KIENZLE

BY [signature]

ATTORNEY

United States Patent Office 3,519,847

Patented July 7, 1970

3,519,847

CIRCUIT ARRANGEMENT FOR DEMODULATING FREQUENCY SHIFT KEYED BINARY SIGNALS

Werner Kienzle, Muhlweg, Germany, assignor to International Standard Electric Corporation, New York, N.Y., a corporation of New York Filed Apr. 21, 1966, Ser. No. 544,292
Claims priority, application Germany, Apr. 23, 1965, St 23,731
Int. Cl. H03d 3/00
U.S. Cl. 307—233 3 Claims

ABSTRACT OF THE DISCLOSURE

A FSK signal detector comprising a first circuit tuned to $f_1$, a second circuit tuned to $f_2$, a first pair of diodes poled in a given direction in series with each other and associated resistors coupled to both the first and second circuits to provide a frequency discriminator for $f_1$, a second pair of diodes poled opposite to the given direction in series with each other and associated resistors coupled to both the first and second circuits to provide a frequency discriminator for $f_2$, load resistors coupled between the two discriminators, and trigger circuits coupled across the load resistors to produce D.C. potentials corresponding to $f_1$ and $f_2$.

Figure 1:
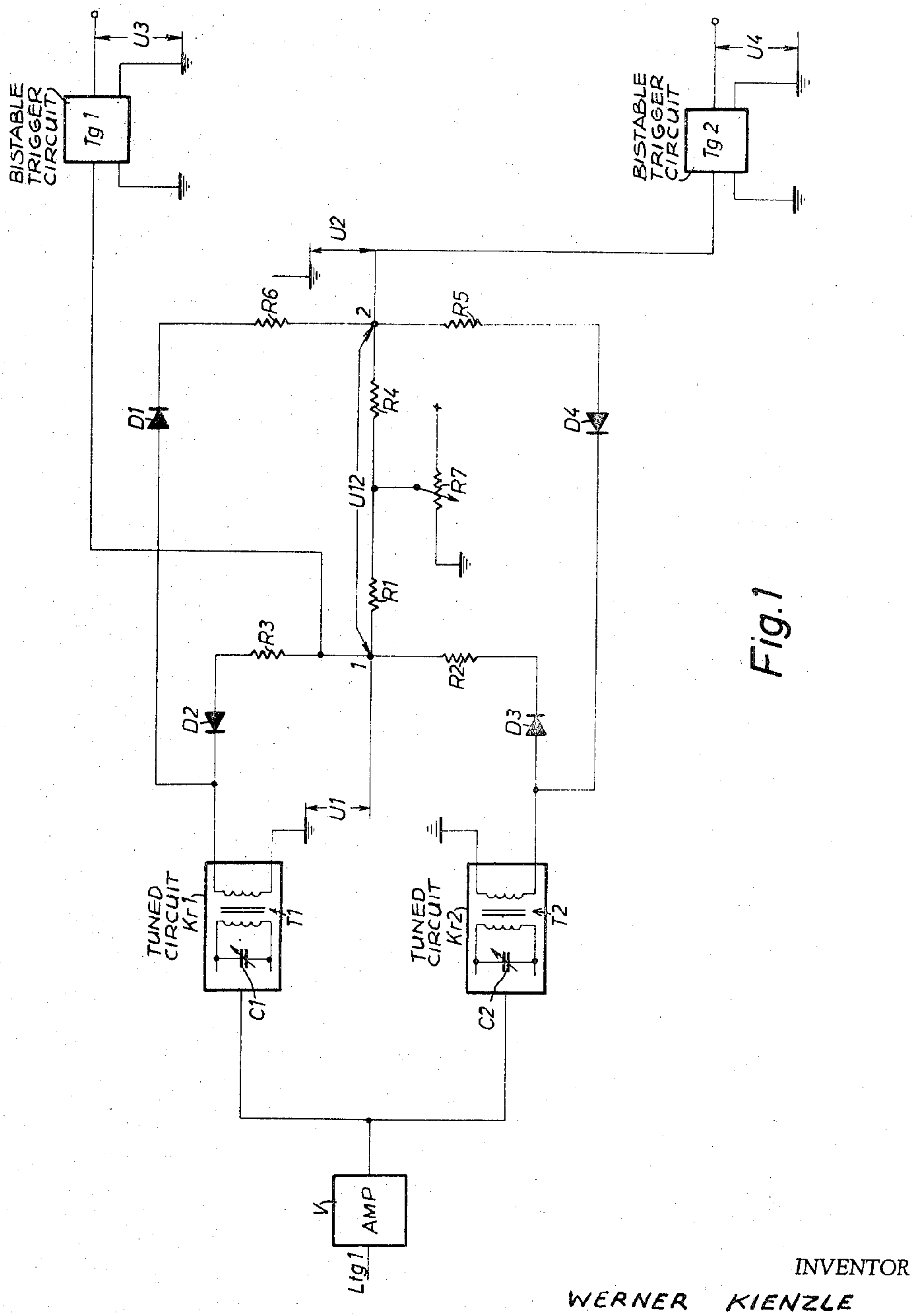

This invention relates to a circuit arrangement for converting A.C. (alternating current) signals into D.C. (direct current) signals and more particularly to a circuit arrangement for demodulating frequency shift keyed binary signals.

Digital information, which may be of the binary type, is represented in the form of two distinct D.C. voltage levels to represent the binary "1" and binary "0." However, there are systems that require the transmission of these binary D.C. levels over transmission media which cannot transmit D.C. signals. This necessitates the conversion of the D.C. signals into voice frequency signals for transmission of the binary information over the D.C. impervious transmission media. It is known in the prior art that a first technique is to convert the D.C. level representing binary "1" to a single voice frequency and to convert the D.C. level representing binary "0" to no voice frequency signal. A second technique is the conversion of the binary information to two distinct single voice frequencies, one frequency representing binary "1" and the other frequency representing binary "0."

It is necessary when incorporating such D.C. to A.C. conversion at the transmitter to reconvert the A.C. into D.C. signals at the receiver to recover the D.C. binary information. One such reconversion technique is operable in conjunction with the first D.C. to A.C. conversion technique mentioned hereinabove. This reconversion process requires an oscillating or resonant circuit having a resonant frequency equal to the frequency of the voice frequency signal transmitted to represent binary "1" to produce an output which is capable of providing the proper D.C. level for this binary condition. When no output is received from the resonant circuit, this is an indication that binary "0" is being received and the appropriate D.C. value is coupled to the output of the receiver. This type of arrangement has the disadvantage that when low frequencies are employed and the resonant circuit has a low selectivity there is not a significant difference in the output to control the trigger stage or switching arrangement in the required precise manner necessary to produce the desirable quasi double current condition at the output of the receiver.

In connection with the second D.C. to A.C. conversion technique mentioned hereinabove, it is possible to achieve a higher degree of reliability and trigger circuit control by employing two oscillating or resonant circuits each responding to a different one of the two frequencies transmitted. With this arrangement it is necessary to provide components coupled to the resonant circuits for producing the switching criteria necessary for the quasi double current condition. In an arrangement employing a frequency discriminator having two resonant circuits the quasi double current behaviour or condition can be achieved with the addition of two bistable multivibrator circuits, such as Schmitt trigger circuits, with one trigger circuit being equipped with transistors of the pnp conductivity type and the other trigger employing transistors of the npn conductivity type.

When transmitting the digital information there often results a zero line asymmetry particularly where a slow frequency drift of the transmitting frequencies occur. This results, at the receiving end in a frequency deviation from the resonant frequency of the discriminator causing the discriminator characteristic to shift its center point off the frequency axis along the ordinate or amplitude axis of the discriminator characteristic. Such deviations may be due to a detuning of the transmitter where carrier frequency transmission is employed due to frequency translation from one frequency region to another frequency region, or at the receiving end by detuning of the discriminator. It has been proposed in the past to subject each of the two differently polarized voltages at the output of the frequency discriminator to a predetermined impedance reduction or voltage level adjustment with the aid of a transistor stage employing transistors of different conductivity types to prevent the zero line asymmetry.

It is an object of this invention to provide a circuit arrangement for demodulating frequency shift keyed binary signals eliminating zero line asymmetry and the low sensitivity present in prior art systems, such as those mentioned hereinabove.

A feature of this invention is the provision of a first means coupled to a source of binary signal tuned to a first frequency representing one condition of the binary signal, a second means coupled to the source of binary signal tuned to a second frequency representing the other condition of the binary signal, a first frequency discriminator means coupled to the first and second means having a first frequency discriminator characteristic with a given slope, and second frequency discriminator means coupled to the first and second means having a second frequency discriminator characteritic with a slope opposite to the given slope and symmetrically related to the first characteristic with respect to the frequency axis thereof, the first and second discriminator means cooperating to convert each of the first and second frequencies to a distinctive signal.

Figure 2A:
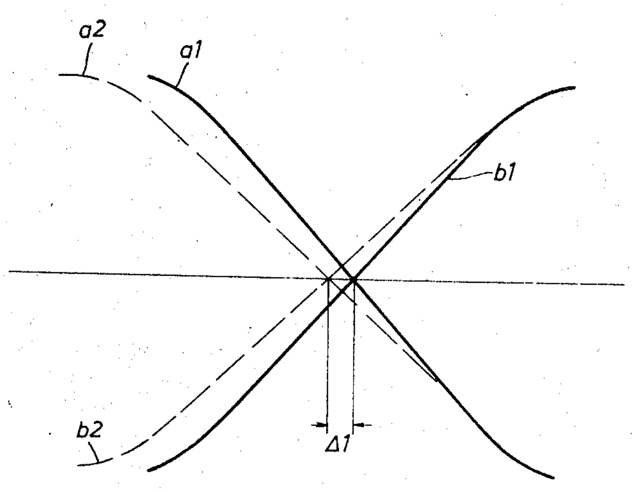
Figure 2B:
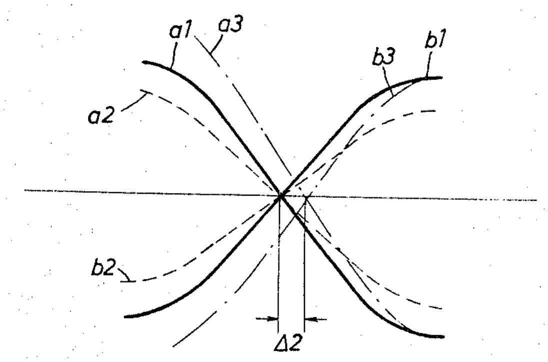
Figure 2C:
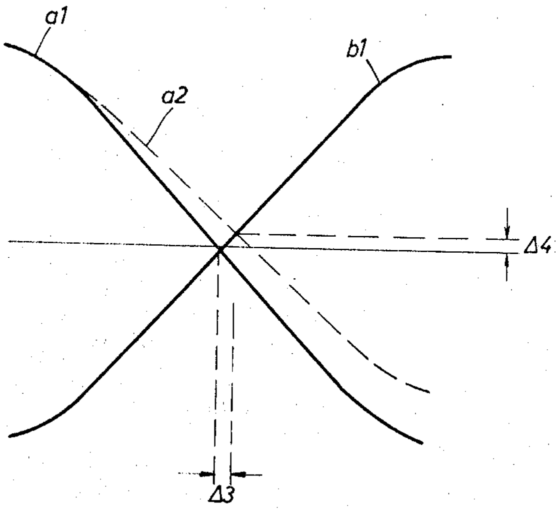
Figure 3A:
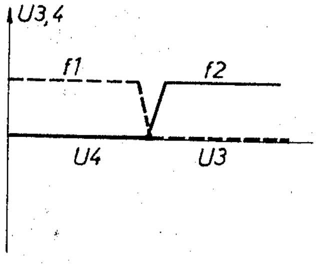
Figure 3B:
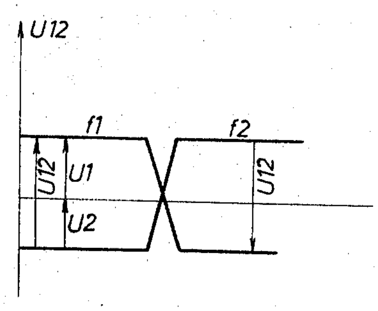

The above-mentioned and other features and objects of this invention will become more apparent by reference to the following description taken in conjunction with the accompanying drawings in which:

FIG. 1 is a schematic diagram of an embodiment of the circuit arrangement in accordance with the principles of this invention;

FIGS. 2*a*, 2*b* and 2*c* illustrate graphically the discriminator characteristics of the parallel connected frequency discriminators of FIG. 1 and the zero point displacement of the crossed discriminator characteristics, where FIG. 2*a* represents the zero point displacement when a change of a resonant frequency occurs, FIG. 2*b* represents the zero point displacement when a change of quality of the discriminator circuit or amplitude of the frequency signals occurs and FIG. 2*c* represents the zero point displacement when one of the operating resistors of one of the discriminators is altered; and FIGS. 3*a* and 3*b* are curves illustrating the voltages occurring at various points in the circuit of FIG. 1.

Referring to FIG. 1, the frequency shift keyed binary signals including a first frequency $f_1$ representing one condition of the binary signal and a second frequency $f_2$ representing the other condition of the binary signal is applied by transmission medium L*tg*1 to an amplifier V. The output of amplifier V is coupled to the oscillating or resonant circuits KR1 and KR2 which are tuned, respectively, to frequencies $f_1$ and $f_2$ by means of variable capacitors C1 and C2 disposed in parallel relation with the primary windings of transformers T1 and T2. Since there is no significance to the present invention of how circuits KR1 and KR2 are coupled to the amplifier V this part of the circuit is shown in a single line fashion for the purposes of illustration. It should be noted in this regard, however, that circuits KR1 and KR2 are connected in series to the output of amplifier V with the primary windings of transformers T1 and T2 constituting the inductance of the tuned circuit.

As mentioned hereinabove circuit KR1 is tuned to the voice frequency $f_1$ and circuit KR2 is tuned to the voice frequency $f_2$. The secondary windings of transformers T1 and T2 are connected to a first frequency discriminator circuit including diodes D2 and D3 and operating resistors R2, R3, R1 and R7. Diodes D2 and D3 are both poled in the same sense or direction in this first discriminator circuit. Also coupled to the secondary windings of transformers T1 and T2 is a second frequency discriminator circuit including diodes D1 and D4 and operating resistors R5, R6, R4 and R7. Diodes D1 and D4 are both poled in the same direction or sense but opposite to the direction that diodes D2 and D3 are poled. The resistors R2 and R3 of the first discriminator circuit and resistors R5 and R6 of the second discriminator circuit establish in a conventional manner the discriminator circuits and also serve to symmetrize or balance the respective discriminator characteristic of the two discriminator circuits with respect to the frequency axis and to match the respective diodes associated therewith to the secondary windings of transformers T1 and T2.

Thus, FIG. 1 illustrates two frequency discriminators coupled in parallel with respect to each other but polarized in opposition thereto resulting in discriminator characteristics as illustrated by the solid lines in FIGS. 2*a*, 2*b* and 2*c*. In these figures the lines *a*1 illustrate the characteristic of the first discriminator employing diodes D2 and D3 while the lines *b*1 represent the characteristic of the second discriminator employing diodes D1 and D4.

Referring particularly to FIG. 2*a* the dashline *a*2 represents the characteristic of the first discriminator and the dashline *b*2 represents the characteristic of the second discriminator when a frequency deviation of the two incoming voice frequencies occurs with respect to the desired frequencies $f_1$ and $f_2$. It will be noted that the point of intersection of curves *a*2 and *b*2 is only displaced on the frequency axis by the amount of $\Delta_1$. As will be noted the amplitude value of the crossover or intersecting point remains unchanged on the abscissa axis. Therefore, the zero line symmetry is maintained by the circuit of FIG. 1 in the case of a frequency deviation.

FIG. 2*b* represents by dash lines *a*2 and *b*2 a change in quality of both circuits or a change in amplitude of both voice frequencies. The dotted lines *a*3 and *b*3 represent the change in quality of only one circuit or a change in amplitude of one voice frequency. It is again illustrated in this figure that the point of intersection between curves *a*3 and *b*3 is displaced only on the abscissa axis. Curves *a*3 and *b*3 represent this displacement of the point of intersection due to a variation of quality of only one discriminator circuit, while curves *a*2 and *b*2 show that there is no displacement of the point of intersection resulting from a variation of quality of both discriminator circuits in the same way and to the same extent. Curves *a*2, *b*2 and *a*3, *b*3 also illustrate a variation of the amplitude of one or both voice frequencies $f_1$ or $f_2$. As illustrated, the intersecting point between curves *a*3, *b*3 is only displaced on the abscissa axis either towards the left or towards the right by the amount $\Delta_2$. This diagram illustrates that there is no influence upon the zero line symmetry of the discriminator characteristics due to variations in the circuit quality or amplitude differences of the voice frequencies $f_1$ and $f_2$.

FIG. 2*c* illustrates in dash line *a*2 the change of discriminator characteristic which would result from variation of one of the two operating resistors R2 and R3 of the first discriminator. A similar characteristic would be obtainable if the second discriminator had one of the two operating resistors R5 and R6 varied. It will be observed that where the operating resistor of the first discriminator is varied that the intersection point of the two discriminator characteristics *a*2 and *b*1 are shifted by an amount $\Delta_3$ on the abscissa axis as well as by an amount $\Delta_4$ on the ordinate axis. In this arrangement there will occur a certain zero point displacement in amplitude or zero point asymmetry. This amplitude displacement, however, can be compensated for, within limits, by adjustment of resistor R7.

The increase in sensitivity with respect to the prior art circuit arrangements is possible with the circuit arrangement of FIG. 1 due to the fact that the prior art technique relied upon the resonance curve of the resonant or oscillating circuit for controlling subsequently arranged trigger stages to produce the proper D.C. voltage for the binary conditions while in the arrangement of FIG. 1 the characteristic of the discriminator are used to control the subsequently coupled trigger stages or switching arrangement. It will be recognized that when utilizing the discriminator characteristics there is achieved a more precise adjustment of the switching threshold of the subsequently coupled trigger stages or switching arrangement than would be possible when utilizing the resonant curves of the oscillating or resonant circuits.

The parallel connected discriminator circuits of FIG. 1 can be coupled to a telegraph relay of the polar type with one coil of this relay being coupled between terminal 1 and ground and the other coil being coupled between terminal 2 and ground. Since terminals 1 and 2 are interconnected by resistors R1, R4 and R7, there is produced a bridge like configuration for the two discriminators such that when point 1 goes positive point 2 goes negative. If the coils of the relay are arranged to respond to positive flowing current the relay in conjunction with switch controlled D.C. sources will appropriately select the proper D.C. value to be coupled to the output of the receiver to represent the two conditions of a binary signal.

Another way of utilizing the parallel connected frequency discriminator FIG. 1 is to couple a first bistable multivibrator or trigger circuit T*g*1, such as a bistable Schmitt trigger circuit, to point 1 and ground potential and a second bistable multivibrator or trigger circuit T*g*2, such as a bistable Schmitt trigger circuit, to point 2 and ground. The two trigger circuits are arranged to respond to an increasing positive voltage above a given trigger threshold for triggering the circuit "on" and to a decreasing positive voltage that turns the trigger "off" when this decreasing voltage is less than the trigger threshold level. At the output of the trigger circuits T*g*1 and T*g*2 will appear the voltages U3 and U4 with respect to ground.

FIG. 3*b* illustrates the voltage between the points 1 and 2 of FIG. 1 with the curve identified by $f_1$ and the curve identified as $f_2$ representing the same voltage but of inversed polarity appearing between these points. The variations at point 1 with respect to ground and at point 2 with respect to ground are similar in configuration to that shown by curves $f_1$ and $f_2$ respectively.

FIG. 3*a* illustrates the resultant voltage at the output of triggers Tg1 and Tg2. It will be observed that trigger Tg1 is turned "off" at a given value above the zero axis (trigger threshold) and trigger Tg2 is turned "on" at this same point.

As previously mentioned zero point asymmetry of the discriminator characteristics of the two discriminators of FIG. 1 can be equalized or compensated within certain limits with the aid of potentiometer R7. Potentiometer R7 also serves to adjust the positive bias (biasing or threshold potential of switch "on" or switch "off" of the trigger circuits Tg1 and Tg2) with respect to the base electrodes of the input transistors of triggers Tg1 and Tg2.

While I have described above the principle of my invention in connection with specific apparatus it is to be clearly understood that this description is made only by way of example and not as a limitation to the scope of my invention as set forth in the objects thereof and in the accompanying claims.

What is claimed is:

1. A circuit arrangement for demodulating frequency shift keyed binary signals comprising:

a source of said binary signals having a first frequency representing one condition of said binary signal and a second frequency representing the other condition of said binary signal;

first means coupled to said source turned to said first frequency;

second means coupled to said source tuned to said second frequency;

first frequency discriminator means coupled to said first and second means having a first frequency discriminator characteristic with a given slope; and second frequency discriminator means coupled to said first and second means having a second frequency discriminator characteristic with a slope opposite said given slope and symmetrically related to said first characteristic with respect to the frequency axis thereof;

said first and second discriminator means cooperating to convert each of said first and second frequencies to a distinctive signal and including third means coupled in common with said first and second discriminator means to combine the output voltage of each of said discriminator means to produce a first alternating signal representing said first frequency and a second alternating signal representing said second frequency; and said first and second discriminator means and said third means including in combination a first diode having one electrode coupled to said first means, a first resistor having one terminal coupled to the other electrode of said first diode, a second resistor having one terminal coupled to the other terminal of said first resistor providing a first junction point, a second diode having one electrode coupled to the other terminal of said second resistor and the other electrode coupled to said second means, said first and second diodes being poled in the same given sense, a third diode having one electrode coupled to said first means, a third resistor having one terminal coupled to the other electrode of said third diode, a fourth resistor having one terminal coupled to the other terminal of said third resistor providing a second junction point, a fourth diode having one electrode coupled to the other terminal of said fourth resistor and the other electrode coupled to said second means, said third and fourth diodes being poled in the same sense opposite to said given sense, a source of given potential, ground potential, a variable resistor having two fixed terminals and a resistance adjusting terminal, one of said fixed terminals being coupled to said source of given potential and the other of said fixed terminals being coupled to said ground potential, a fifth resistor having one terminal coupled to said first junction point and the other terminal coupled to said resistance adjusting terminal, and a sixth resistor having one terminal coupled to said second junction point and the other terminal coupled to said resistance adjusting terminal, said first alternating signal being present at one of said first and second junction points, said second alternating signal being present at the other of said first and second junction points.

2. An arrangement according to claim 1, further including fourth means coupled between said first and second junction points and said ground potential to respond to said first and second alternating signals and produce a distinctive direct current signal representing each of said first and second frequencies.

3. An arrangement according to claim 1, wherein said fourth means includes a first bistable trigger means coupled between one of said first and second junction points and said ground potential, and a second bistable trigger means coupled between the other of said first and second junction points and said ground potential.

References Cited

UNITED STATES PATENTS

| | | | |
|---|---|---|---|
| 3,223,929 | 12/1965 | Hofstad et al. | 307—210 |
| 3,082,378 | 3/1963 | Slaton | 329—112 X |
| 3,281,701 | 10/1966 | Axe | 307—233 |
| 3,320,538 | 5/1967 | Rhead | 329—112 X |

DONALD D. FORRER, Primary Examiner

B. P. DAVIS, Assistant Examiner

U.S. Cl. X.R.

329—112; 328—133